July 27, 1965
L. H. MORIN
3,197,535
METHOD OF FORMING THREE CAST-UNITED AND
RELATIVELY MOVABLE ELEMENTS
Filed April 20, 1962
2 Sheets-Sheet 1
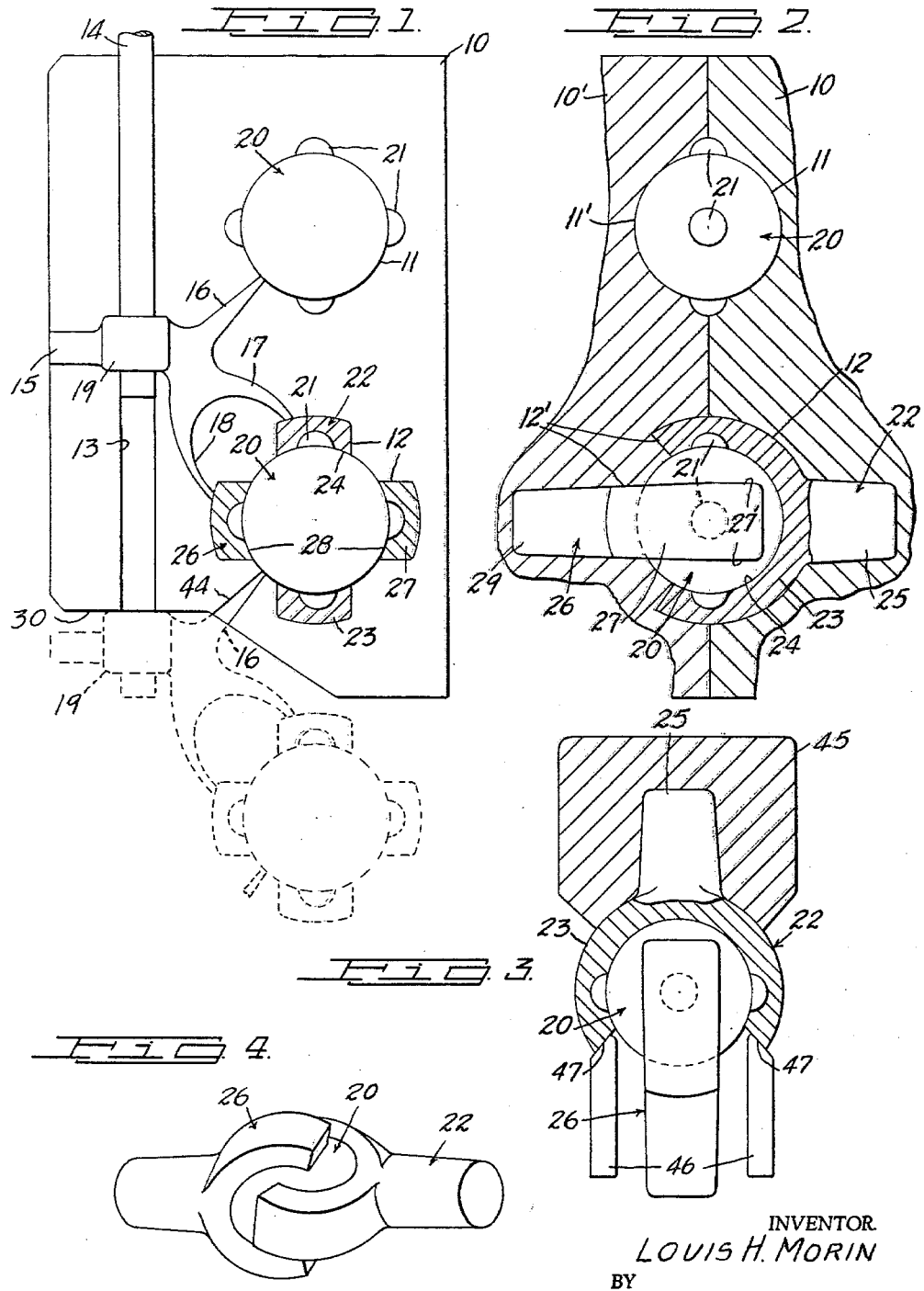
INVENTOR.
LOUIS H. MORIN
BY
Howard Thompson
ATTORNEY

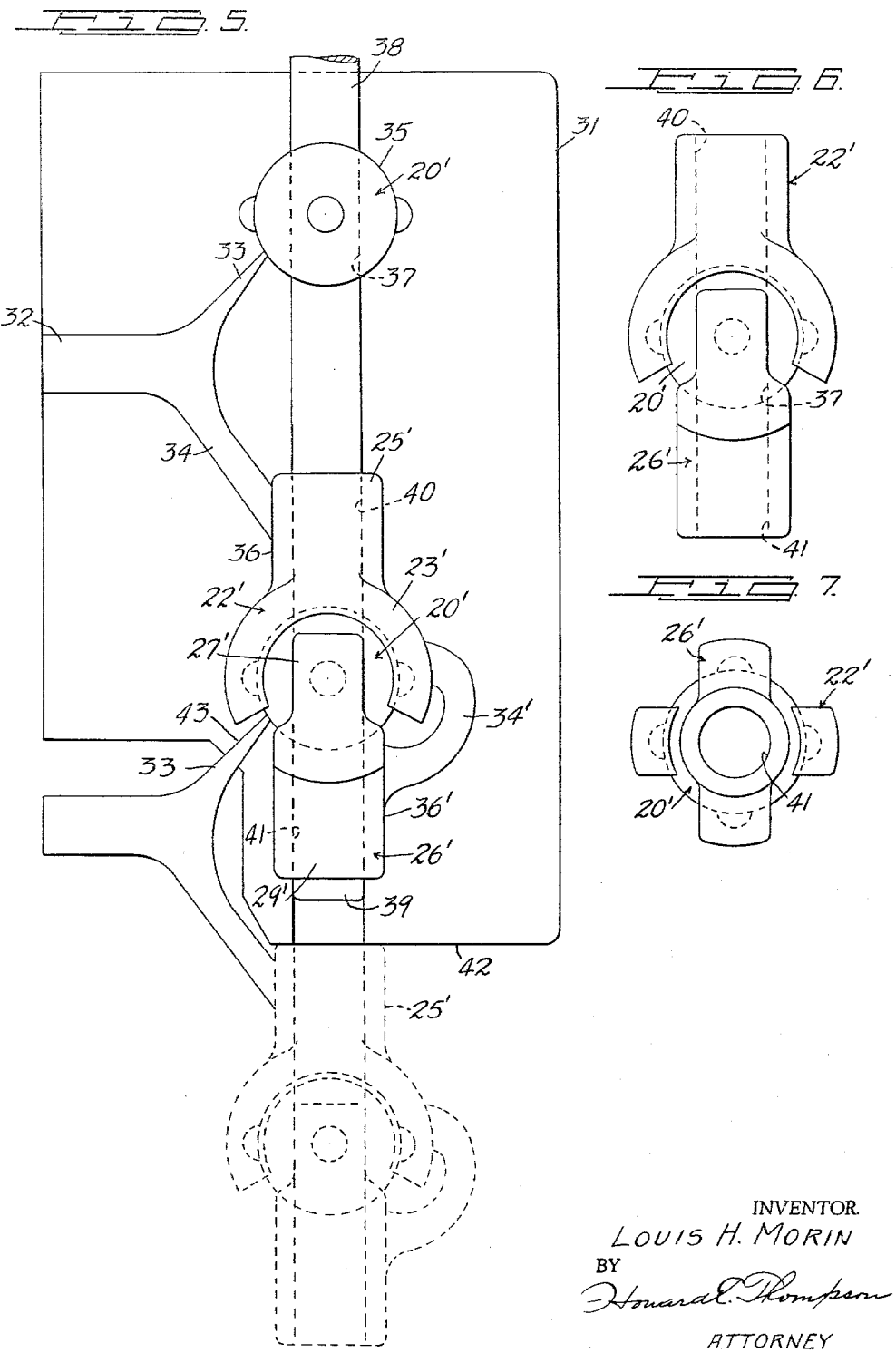

3,197,535
METHOD OF FORMING THREE CAST-UNITED AND RELATIVELY MOVABLE ELEMENTS
Louis H. Morin, 125 Beechwood Ave., New Rochelle, N.Y.
Filed Apr. 20, 1962, Ser. No. 188,992
3 Claims. (Cl. 264—242)

This invention relates to the method of die casting three united elements in producing a product, wherein all of the united elements are relatively movable. More particularly, the invention deals in a method of producing a product such, for example, as a universal joint comprising a center spherical element and a pair of fork or yoke elements keyed to and movable relatively to each other and said center element.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic face view of a die illustrating one method of carrying my invention into effect, with one formed product shown in removed position with respect to the die in dotted lines and with part of the casting shown in section.

FIG. 2 is a sectional view through the cavities of a pair of dies, as shown in FIG. 1, with part of the casting shown in elevation and part of one casting being broken away and shown in section.

FIG. 3 is a diagrammatic sectional view illustrating tools for spreading the yokes of each cast product a very slight extent in order to provide free movement of the yokes on the center element or ball.

FIG. 4 is a diagrammatic perspective view of a universal joint formed in accordance with my improved method.

FIG. 5 is a view, similar to FIG. 1, showing all of the castings in elevation on the surface of the die and illustrating a finished formed casting in removed position from the die in dotted lines.

FIG. 6 is a side view of the product as formed by the method as illustrated in FIG. 5; and FIG. 7 is an end view of the product as shown in FIG 6.

In illustrating one adaptation and use of my invention of casting three independent elements one upon another in a manner to provide relative movement of the elements one with respect to the other, I have diagrammatically illustrated the formation of a universal joint, employing two mounting elements integrally joined with a center spherical element, with which the mounting elements are keyed to retain the same in predetermined positioning on the center element.

Further, the invention deals primarily with the formation of end products of the character defined of relatively small sizes, adapting these products to many uses, wherein universal joint couplings are required, thus effecting a material saving in the cost of production and the resulting purchase price to the customer or user.

In FIGS. 1 and 2 of the drawing, I have diagrammatically shown one method of procedure. Fig. 2 shows a sectional view through a pair of dies 10, 10', having spaced registering cavities 11, 11' at the upper end thereof, as shown in the drawing, and registering cavities 12, 12' in the lower portion of the dies. In FIG. 1 of the drawing, a face view of the die 10 only is shown and each die will have, at one side of the cavities therein, registering recesses, one of which is shown at 13 in FIG. 1, which collectively form a bore, in which a core and transfer pin 14 is movably supported, as diagrammatically shown.

In Fig. 1, 15 represents the sprue passage for injection of the casting material into the cavities 11, 11'; 12, 12' of the die through spaced runners 16, 17 and 18, the runner 16 extending to the cavities 11, 11'; whereas, the runners 17 and 18 extend to spaced portions of the cavities 12, 12'. It will appear that the dies have an enlarged cavity between 15 and the runners 16, 17 and 18 to form on the pin 14 a sleeve portion 19, the purpose of which will be later described.

The runner 16, in filling the cavities 11, 11', will form one cast element, generally identified by the reference character 20, the element being in the form of a sphere or ball and will have four circumferentially spaced half-round key nubbins 21 on the periphery thereof.

The runner 17 extends to one part of the cavities 12, 12' in forming one yoke element 22 upon a pre-formed element 20 then positioned within the cavity 12, the element 22 including a fork or yoke portion 23, shown in section in FIG. 2, the internal diameter 24 of the yoke portion being formed directly upon the element 20 and on two of the opposed nubbins 21, as clearly seen. The element 22 further includes an extended mounting or coupling portion 25, shown in elevation in FIG. 2 of the drawing.

The cavities 12, 12' also include a portion forming another element 26 which, in the construction shown, is identical to the element 22, in other words, includes a fork or yoke portion 27, similar to 23, which is again formed directly upon the element 20 and around the other opposed nubbins 21 of said element, as will be apparent from a consideration of FIGS. 1 and 2 of the drawing, the inner diameter of 27 being indicated at 28 in FIG. 1 of the drawing. The element 26, like the element 22, includes a mounting or coupling portion 29. It will clearly appear from a consideration of FIG. 2 of the drawing that the side walls of 25, 29 as well as 23 and 27, are tapered for free removal of the elements from the die cavities. However, the ends of the yokes will have straight or slightly contracted sides, as at 27' in FIG. 2, the yoke 23 being similarly formed. This is to freely remove each of the yokes from the opposed die. It will clearly appear, from FIG. 2, that the end portions of 23 are formed in cavity portions 12' of the die 10' and, in like manner, the end portions of 27 are formed in the cavity portions 12 of the die 10. While the ends of both yokes can be formed of any desired contour, the structure, as shown, will provide a relatively large bearing area of the yoke ends upon the center spherical or ball element 20.

It will appear, from a consideration of FIG. 1 of the drawing, that, in each pressure injection of casting material into the die cavities, one element 20 and the two elements 22 and 26 are simultaneously formed and, by virtue of the runners, these elements are joined in the cast sleeve 19 formed around the pin 14; thus, when the dies 10, 10' are open, the cast elements remain on the pin 14 and the pin is fed down to the dotted line position of FIG. 1, which brings the sleeve 19 in position to engage the surface 30 of the dies when the dies are moved into a closed position and this movement of the pre-cast elements is diagrammatically illustrated in dotted lines in FIG. 1. Then, the pin 14 is raised to the position shown in full lines in FIG. 1 and the next successive casting of the three elements is performed. At the dotted line station of FIG. 1, the formed products can be trimmed to remove the runners, or this can be accomplished at a station spaced with respect to the dotted line position illustrated, but while the cast products are still in assembled relationship to each other through the medium of the runners 16, 17 and 18.

In FIG. 5 of the drawing, I have shown a modified method of procedure and, in this figure, 31 represents the face view of the modified form of die employed, wherein the sprue or gate 32 has two runners 33 and 34, the runner 34 being materially larger than the runner 33 and these extend to cavities 35 and 36, respectively, the cavity 35 forming an element 20′, generally similar to the element 20, modified to the extent that a bore or aperture 37 is formed therein by virtue of the fact that a transfer core pin 38 is positioned in the cavity 35. This core pin also extends into the cavity 36, including the supplemental portion 36′ of this cavity and terminates, as seen at 39. The cavities 36, 36′ are joined in a supplemental runner 34′, so as to extend the cast material directly injected into the cavity 36 to the supplemental cavity 36′, as diagrammatically seen in FIG. 5. The cavity 36 will form an element 22′, generally similar in contour to the element 22, and differing primarily from the element 22 in having a bore or aperture 40 extending through the fork or yoke end 23′ and the mounting or coupling end 25′. In like manner, the cavity 36′ will form an element 26′, generally similar to the element 26, except in having a bore or aperture 41 extending through the yoke 27′ and the mounting or coupling end 29′.

With the various elements in the relationship as cast in FIG. 5 and shown in FIGS. 6 and 7, the bores 40, 41 will be in alinement with the bore 37 of the element 20′. In FIG. 5 of the drawing, it will be apparent that, after one casting operation, which results in forming an element 20′ and the two elements 22′, 26′ on the pre-cast element 20′, the shifting of the cast products to the dotted line position of FIG. 5 will bring the end surface of 25′ adjacent the lower surface 42 of the die 31 for the stripping operation to return the pin 38 to the full line position of FIG. 5. It will be apparent that the runner 33 is positioned in a cavity portion 43 of the die when the cast product is in the dotted line position of FIG. 5. This is also true with the structures shown in FIG. 1, wherein the runner 16 is positioned in a cavity portion 44 of the die 10 and the associated die 10′.

In both forms of construction shown, is will be understood that the cavities 12, 12′ and the cavities 36, 36′ will include portions snugly receiving the pre-cast elements 20, 20′, respectively.

In FIG. 3 of the drawing, I have shown one step in the method of producing the resulting end product and, in this figure, the elements 20, 22 and 26 are shown for illustrative purposes, it being understood that the same operation will be performed on the modified elements 20′, 22′, 26′, shown in FIGS. 5 to 7, inclusive. This step consists in positioning each of the elements 22, 26 in a back-up nest-type tool 45 receiving the mounting or coupling ends and seating upon part of the yokes and in moving a pair of spreader tools 46 into engagement with bevelled surfaces 47 at ends of the yokes to apply sufficient pressure to free the yokes from the snug engagement with the center element, the yokes being freed in a matter of a few thousandths in order to provide free movement of the various elements one with respect to the other in providing the universal joint structure.

In FIG. 4 of the drawing, I have diagrammatically illustrated the universal joint assembly as applied to the elements as shown in FIGS. 1 to 3, inclusive in order to more clearly visualize the resulting end product. In this figure, the elements 20, 22 and 26 only are identified, as more specific reference to the elements has been applied to the detail showing thereof in the other figures.

In FIG. 6 of the drawing, a side elevation of the product produced by the elements 20′, 22′ and 26′ is shown; whereas, FIG. 7 shows an end view of the product, as seen in FIG. 6, and, in this view, the bore 41 of the element 26 is clearly illustrated, this bore being in alinement with the bore 37 of 20′ and the bore 40 of 22′.

The bores 41 and 40 adapt the mounting or coupling ends of the elements 22′, 26′ for mounting in connection with rods or the like, which can extend into these bores. It will be understood, in this connection, that the dies 10, 10′ can be so formed as to provide recesses in ends of the mounting or coupling portions 25, 26, if the latter is so desired.

While the foregoing illustrates one desirable adaptation and use of my invention, it will be apparent that three relatively movable elements of any type or kind can be formed in accordance with the method defined, regardless of the structure or arrangement of the elements one with respect to the other.

Having fully described my invention, what I claim as new and desire to secure by Letters Patent is:

1. The method of forming a die cast product comprising united relatively movable elements the first element being generally spherical in form and having two pairs of nubbins therein and a pair of second named elements each including yoke portions adapted to partially envelope said spherical element and be attached thereto by said nubbins, which consists in simultaneously forming in a pair of dies said first element and said two other elements in spaced cavities of said dies by pressure injection of casting material simultaneously into the spaced cavities of the dies, then shifting the cast elements by a core pin to move the first named element into registering position with the second named cavities, whereby, in the next successive casting operation, the second named elements are formed directly upon the pre-cast first named element then positioned in the cavities forming said second named elements, arranging said core pin in said dies to form, during the casting operation, an aperture in each element with said apertures aligned with each other, and stripping the core pin from the cast product comprising the assemblage of all of said elements and returning said core pin to position for reception of the next casting operation.

2. A method as defined in claim 1, wherein said core pin is positioned within cavities forming all of said elements, and said core pin being utilized in shfting the first element to the position registering with the cavities forming the second named elements and for moving the cast end product into position, facilitating stripping of the core pin therefrom in returning the core pin to position receiving the next successive casting.

3. A method as defined in claim 1, wherein said aligned apertures are utilized in forming bores extending through all of said elements.

References Cited by the Examiner

UNITED STATES PATENTS

| | | | |
|---|---|---|---|
| 677,869 | 7/01 | Kinsler | 64—17 |
| 1,143,596 | 6/16 | Bockhoff | 64—17 |
| 1,153,789 | 9/15 | Hopkins | 64—17 |
| 2,243,062 | 5/41 | Anderson | 22—203 |
| 2,529,586 | 11/50 | Barber | 22—203 |
| 2,555,754 | 6/51 | Morin | 264—242 |
| 2,714,949 | 8/55 | Morin | 264—255 |
| 2,819,494 | 1/58 | Morin | 264—252 |

ROBERT F. WHITE, *Primary Examiner.*

KARL J. ALBRECHT, ALEXANDER H. BRODMERKEL, *Examiners.*